(12) United States Patent
Blount

(10) Patent No.: US 6,287,567 B1
(45) Date of Patent: Sep. 11, 2001

(54) METHOD OF MAKING AN HERBAL DRINK

(76) Inventor: Dorothy J. Blount, 2908 7th St. Northwest #1, Washington, DC (US) 22017

( * ) Notice: Subject to any disclaimer, the term of this patent is extended or adjusted under 35 U.S.C. 154(b) by 0 days.

(21) Appl. No.: 09/480,526

(22) Filed: Jan. 7, 2000

(51) Int. Cl.⁷ .......................... A01N 65/00; A01N 25/00; A23F 3/00; A23L 2/00
(52) U.S. Cl. ...................... 424/195.1; 426/597; 426/599; 514/783
(58) Field of Search .................................. 426/597, 599; 424/195.1; 514/783

(56) References Cited

U.S. PATENT DOCUMENTS

| | | | |
|---|---|---|---|
| 4,059,695 | 11/1977 | Hirosaki et al. | 424/750 |
| 4,357,361 | 11/1982 | Lunder et al. | 426/597 |
| 4,412,984 | 11/1983 | Van Der Loo et al. | 424/58 |
| 4,851,252 | 7/1989 | Greither et al. | 426/599 |
| 5,376,374 | 12/1994 | Zelaya | 424/726 |
| 5,482,712 * | 1/1996 | Kim et al. | 424/195.1 |
| 5,595,779 * | 1/1997 | Shimabukuro | 426/597 |
| 5,716,928 | 2/1998 | Benet et al. | 514/11 |
| 5,744,187 * | 4/1998 | Gaynor | 426/599 |
| 5,869,540 * | 2/1999 | Smith | 514/783 |
| 5,968,520 * | 10/1999 | Nam et al. | 424/195.1 |

FOREIGN PATENT DOCUMENTS

| | | | |
|---|---|---|---|
| 52003815A * | 1/1977 | (JP) . | |
| 56122315A * | 9/1981 | (JP) . | |
| 2000083654A * | 3/2000 | (JP) . | |
| 2102078C1 * | 1/1998 | (RU) . | |
| 706441A * | 7/1978 | (SU) . | |
| 1788894A3 * | 1/1993 | (SU) . | |

* cited by examiner

*Primary Examiner*—Jose' G. Dees
*Assistant Examiner*—Robert DeWitty

(57) ABSTRACT

A method of making an herbal drink for relieving symptoms of fatigue, congestion, fever and asthma. The method of making an herbal drink includes making an herbal drink for relieving symptoms of various ailments such as cough, fever and fatigue. The drink is formed by straining water through a combination of equal portions of rosehip, goldenseal, comfrey leaf, bee pollen, spearmint, chickweed, comfrey root, chamomile flower, catnip, mullein, pennyroyal, eucalyptus, and licorice root.

4 Claims, No Drawings

METHOD OF MAKING AN HERBAL DRINK

BACKGROUND OF THE INVENTION

1. Field of the Invention

The present invention relates to herbal drinks and more particularly pertains to a new method of making an herbal drink for relieving symptoms of fatigue, congestion, fever and asthma.

2. Description of the Prior Art

The use of herbal drinks is known in the prior art. More specifically, herbal drinks heretofore devised and utilized are known to consist basically of familiar, expected and obvious configurations.

Known prior art includes U.S. Pat. No. 4,851,252; U.S. Pat. No. 4,412,984; U.S. Pat. No. 4,357,631; U.S. Pat. No. 5,376,374; U.S. Pat. No. 5,716,928; and U.S. Pat. No. 4,059,695.

While these devices fulfill their respective, particular objectives and requirements, the aforementioned patents do not disclose a new method of making an herbal drink. The inventive device includes making an herbal drink for relieving symptoms of various ailments such as cough, fever and fatigue. The drink is formed by straining water through a combination of equal portions of rosehip, goldenseal, comfrey leaf, bee pollen, spearmint, chickweed, comfrey root, chamomile flower, catnip, mullein, pennyroyal, eucalyptus, and licorice root.

In these respects, the method of making an herbal drink according to the present invention substantially departs from the conventional concepts of the prior art, and in so doing provides an apparatus primarily developed for the purpose of relieving symptoms of fatigue, congestion, fever and asthma.

SUMMARY OF THE INVENTION

In view of the foregoing disadvantages inherent in the known types of herbal drinks now present in the prior art, the present invention provides a new method of making an herbal drink construction wherein the same can be utilized for relieving symptoms of fatigue, congestion, fever and asthma.

The general purpose of the present invention, which will be described subsequently in greater detail, is to provide a new method of making an herbal drink which has many of the advantages of the herbal drinks mentioned heretofore and many novel features that result in a new method of making an herbal drink which is not anticipated, rendered obvious, suggested, or even implied by any of the prior art herbal drinks, either alone or in any combination thereof.

To attain this, the present invention generally comprises making an herbal drink for relieving symptoms of various ailments such as cough, fever and fatigue. The drink is formed by straining water through a combination of equal portions of rosehip, goldenseal, comfrey leaf, bee pollen, spearmint, chickweed, comfrey root, chamomile flower, catnip, mullein, pennyroyal, eucalyptus, and licorice root.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

DESCRIPTION OF THE PREFERRED EMBODIMENT

Step 1: Chop in a blender one ounce of rosehip.

Step 2: Mix together in a bowl equal portions of the rosehip, goldenseal, comfrey leaf, bee pollen, spearmint, chickweed, comfrey root, chamomile flower, catnip, mullein, pennyroyal, eucalyptus, and licorice root to form a mixture. One ounce of each of the ingredients should be used.

Step 3: Pour four cups of water into a container.

Step 4: Add four teaspoons of the mixture to the container.

Step 5: Heat the water and the mixture until the water boils.

Step 6: Simmer the water and the mixture for minutes.

Step 7: Cool the water.

Step 8: Pour the water and mixture through a strainer such that particles of the mixture are left as a residue in the strainer and a drinkable tea liquid passes through the strainer.

Step 9: Cool the tea to a temperature below fifty degrees Fahrenheit for temporary storage.

Alternatively, after forming the mixture, the mixture may be placed in tea bags and used in the standard manner of tea bag use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of making an herbal drink, said method comprising the steps of:

mixing together in a bowl equal portions of rosehip, goldenseal, comfrey leaf, bee pollen, spearmint, chickweed, comfrey root, chamomile flower, catnip, mullein, pennyroyal, eucalyptus, and licorice root to form a mixture;

chopping said rosehip in a blender, wherein one ounce of each ingredient of said mixture is used; and placing said mixture in water.

2. The method of making an herbal drink as in claim 1, said method further comprising the step of:

placing said mixture in a tea bag, said tea bag being water permeable.

3. A method of making an herbal drink including the steps of:

mixing together in a bowl equal portions of rosehip, goldenseal, comfrey leaf, bee pollen, spearmint, chickweed, comfrey root, chamomile flower, catnip, mullein, pennyroyal, eucalyptus, and licorice root to form a mixture;

pouring four cups of water into a container;

adding four teaspoons of said mixture to said container;

heating said water and said mixture until said water boils;

simmering said water and said mixture for four minutes;

cooling said water;

pouring said water and mixture through a strainer such that particles of said mixture is left as a residue in said strainer and a drinkable tea liquid passes through said strainer; and cooling said tea to a temperature below fifty degrees Fahrenheit for temporary storage.

4. A method of making an herbal drink, said method comprising the steps of:

chopping in a blender one ounce of rosehip;

mixing together in a bowl equal portions of said rosehip, goldenseal, comfrey leaf, bee pollen, spearmint, chickweed, comfrey root, chamomile flower, catnip, mullein, pennyroyal, eucalyptus, and licorice root to form a mixture;

pouring four cups of water into a container;

adding four teaspoons of said mixture to said container;

heating said water and said mixture until said water boils;

simmering said water and said mixture for four minutes;

cooling said water;

pouring said water and mixture through a strainer such that particles of said mixture is left as a residue in said strainer and a drinkable tea liquid passes through said strainer; and cooling said tea to a temperature below fifty degrees Fahrenheit for temporary storage.

\* \* \* \* \*